(12) United States Patent
Lu et al.

(10) Patent No.: US 10,162,450 B2
(45) Date of Patent: Dec. 25, 2018

(54) ARRAY SUBSTRATE, DISPLAY PANEL AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Zhongshou Huang, Shanghai (CN); Xianxiang Zhang, Shanghai (CN); Xiaoye Li, Shanghai (CN); Gang Liu, Shanghai (CN); Yingying Xu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 118 days.

(21) Appl. No.: 14/618,897

(22) Filed: Feb. 10, 2015

(65) Prior Publication Data
US 2016/0103547 A1    Apr. 14, 2016

(30) Foreign Application Priority Data
Oct. 10, 2014 (CN) .......................... 2014 1 0531586

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS

2010/0194697 A1*  8/2010  Hotelling ............. G06F 3/0412
                                                        345/173
2013/0162570 A1*  6/2013  Shin .................... G06F 3/041
                                                        345/173
(Continued)

FOREIGN PATENT DOCUMENTS

CN     101320185 B    12/2008
CN     102955636 A     3/2013
(Continued)

OTHER PUBLICATIONS

Office Action as issued in corresponding German Application 102015103345.3, dated Jun. 2, 2015.

*Primary Examiner* — Joseph R Haley
*Assistant Examiner* — Emily Frank
(74) *Attorney, Agent, or Firm* — Alston & Bird LLP

(57) ABSTRACT

An array substrate includes a plurality of data lines; a plurality of scanning lines intersecting the data lines to define pixel units; a plurality of pixel electrodes within the pixel units; and a plurality of touch electrodes having a grid shape and formed by a plurality of first sub-electrodes and a plurality of second sub-electrodes intersecting each other. Projections of the first sub-electrodes and the second sub-electrodes onto a layer containing the pixel electrodes are respectively located between adjacent pixel electrodes, or the first sub-electrodes and the second sub-electrodes are respectively located between adjacent pixel electrodes. The product of the resistance of the touch electrode and the load capacitance between the touch electrode, the source electrode and the first metal is reduced, which reduces the charging time of the touch driving signal and enables the (Continued)

touch state and the display state to operate in a time division manner.

19 Claims, 8 Drawing Sheets

(51) Int. Cl.
G02F 1/1333 (2006.01)
G02F 1/1362 (2006.01)
G02F 1/1343 (2006.01)

(52) U.S. Cl.
CPC .... *G02F 1/13338* (2013.01); *G02F 1/136286* (2013.01); *G02F 2001/134372* (2013.01); *G06F 2203/04112* (2013.01)

(56) References Cited

U.S. PATENT DOCUMENTS

| | | | |
|---|---|---|---|
| 2013/0293791 A1* | 11/2013 | Abe | G06F 3/0418 349/12 |
| 2014/0168149 A1* | 6/2014 | Han | G06F 3/0412 345/174 |
| 2016/0011447 A1* | 1/2016 | Choi | G02F 1/13338 349/12 |
| 2016/0026290 A1* | 1/2016 | Liu | G06F 3/0412 345/174 |
| 2016/0041664 A1* | 2/2016 | Qin | G06F 3/044 345/173 |
| 2016/0048267 A1* | 2/2016 | Lee | G06F 3/0418 345/173 |
| 2016/0154515 A1* | 6/2016 | Mu | G06F 3/044 345/174 |
| 2016/0188029 A1* | 6/2016 | Liu | G02F 1/13338 345/174 |
| 2016/0266697 A1* | 9/2016 | Cheng | G06F 3/044 |

FOREIGN PATENT DOCUMENTS

| | | |
|---|---|---|
| CN | 103019492 A | 4/2013 |
| CN | 103676280 A | 3/2014 |
| CN | 103926729 A | 7/2014 |
| DE | 102013112603 A1 | 6/2014 |

* cited by examiner

ARRAY SUBSTRATE, DISPLAY PANEL AND DISPLAY DEVICE

CROSS-REFERENCES TO RELATED APPLICATIONS

This application claims the benefit of priority to Chinese Patent Application No. 201410531586.4, filed with the Chinese Patent Office on Oct. 10, 2014 and entitled "ARRAY SUBSTRATE, DISPLAY PANEL AND DISPLAY DEVICE", the content of which is incorporated herein by reference in its entirety.

TECHNICAL FIELD

The disclosure relates to the field of display technologies, in particular to an array substrate, a display panel and a display device.

BACKGROUND OF THE INVENTION

With the development of modern electronic technology, components for achieving functions such as capacitive touch functions are disposed on a display panel device to bring convenience to users.

Nowadays, depending on the implementation, the capacitive touch function may be implemented as a self-capacitive touch function or a mutual-capacitive touch function. The self-capacitive touch function refers to a touch function achieved by capacitance formed between a touch electrode and ground, and the mutual-capacitive touch function refers to a touch function achieved by capacitance formed between a touch driving electrode and a touch sensing electrode.

In the related art, to achieve the capacitive touch function, typically a common electrode disposed on an array substrate is also used as a touch electrode, i.e., the common electrode is configured to receive a common voltage signal in the display state, and is used as a touch electrode to receive a touch driving signal in the touch state. When the touch electrode is used as a touch driving electrode, the touch sensing electrode corresponding to the touch driving electrode is disposed on a side of a color filter substrate facing away from the array substrate.

FIG. 1 is a schematic diagram of a structure of an array substrate in the related art. As shown in FIG. 1, the array substrate, on which the common electrode is also used as a touch electrode, includes: a transparent substrate 11; an interlayer 12 on the transparent substrate 11; and a Thin-Film Transistor (TFT) 13 on the interlayer 12, where the TFT 13 includes a source electrode 131, a drain electrode 132, a gate electrode 133 and a polycrystalline silicon layer 134, the gate electrode 133 is electrically insulated from the polycrystalline silicon layer 134 by a first passivation layer 141, the gate electrode 133 is electrically insulated from the source electrode 131 and the drain electrode 132 by a second passivation layer 142, and the source electrode 131 is electrically connected with a data line 135 via a first metal 136; the array substrate further includes an organic film layer 15 on the second passivation layer 142, a common electrode 16 on the organic film layer 15, and a pixel electrode 17 above the common electrode 16; where the common electrode 16 is electrically insulated from the pixel electrode 17 by a third passivation layer 143, and the common electrode 16 is also used as the touch electrode.

Based on operating principles of the capacitive touch function, the touch electrode needs to be charged at the beginning of the touch state (regardless of whether it is a self-capacitive touch function or a mutual-capacitive touch function), that is, a touch driving signal is provided to the touch electrode. As shown in FIG. 1, the common electrode 16 has a planar shape and is made of a transparent conductive material, thus the resistance of the common electrode 16 is large. Moreover, the overlapping area between the source electrode 131 of the TFT 13 as well as the first metal 136 and the common electrode 16 is large, so that a large load capacitance is formed, and hence, the product of the load capacitance and resistance of the touch electrode is large, resulting in a long charging time of the touch driving signal, so that there is insufficient time available for the touch state and the display state to operate in a time division manner.

BRIEF SUMMARY OF THE INVENTION

In view of the foregoing, embodiments of the disclosure provide an array substrate, a display panel and a display device, which solve the problems in the related art, which does not have sufficient time available for the touch state and the display state to operate in a time division manner due to a long charging time of the touch driving signal, which is caused by the large product of the resistance of the touch electrode and the load capacitance formed between the touch electrode and the source electrode as well as the first metal.

In a first aspect, the present disclosure provides an array substrate, which includes:

a plurality of data lines;

a plurality of scanning lines which intersect the plurality of data lines to define pixel units;

a plurality of pixel electrodes disposed within the pixel units; and a plurality of touch electrodes, each having a grid shape and formed by a plurality of first sub-electrodes and a plurality of second sub-electrodes intersecting the plurality of first sub-electrodes; projections of the first sub-electrodes and the second sub-electrodes onto a layer containing the pixel electrodes are respectively located between adjacent pixel electrodes, or the first sub-electrodes and the second sub-electrodes are respectively located between adjacent pixel electrodes.

In a second aspect, the present disclosure provides a display panel, which includes a color filter substrate, an array substrate disposed opposite to the color filter substrate, and a liquid crystal layer between the color filter substrate and the array substrate; where the array substrate is the array substrate described in the first aspect.

In a third aspect, the present disclosure provides a display device, which includes the display panel described in the second aspect.

DETAILED DESCRIPTION OF THE INVENTION

The present disclosure will be further described in detail below in conjunction with the accompanying drawings and embodiments. It is to be understood that specific embodiments described herein are merely for explaining the present disclosure rather than limiting the present disclosure. Additionally, it is noted that merely partial contents associated with the present disclosure rather than all contents are illustrated in the accompanying drawings for ease of description.

Figure 1:
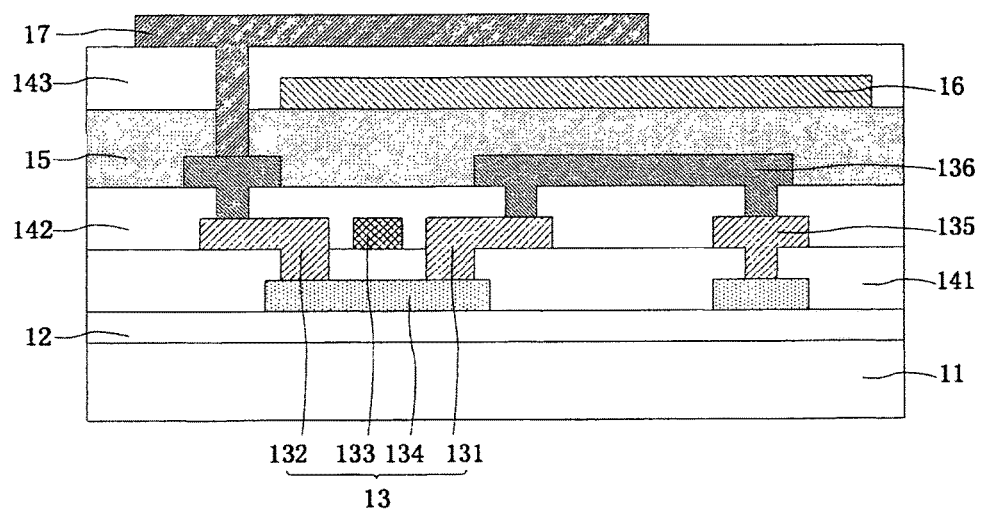
FIG. 1 is a schematic diagram of a structure of an array substrate in the related art.
Figure 2A:
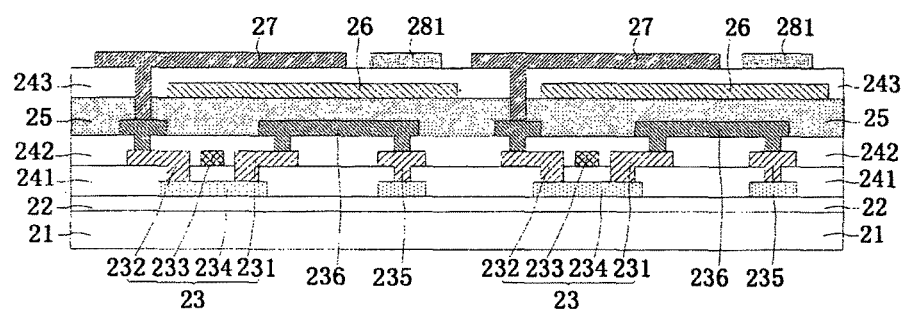
FIG. 2A is a schematic diagram of a partial structure of an array substrate according to an embodiment of the disclosure.

FIG. 2A is a schematic diagram of a structure of an array substrate according to an embodiment of the disclosure. As shown in FIG. 2A, the array substrate includes: a plurality of data lines 235; a plurality of scanning lines (not shown in FIG. 2A) which intersect the plurality of data lines 235 to define pixel units (not shown in FIG. 2A); pixel electrodes 27 disposed within the pixel units; and a plurality of touch electrodes, each of which has a grid shape and is formed by a plurality of first sub-electrodes 281 and a plurality of second sub-electrodes (not shown in FIG. 2A) intersecting the plurality of first sub-electrodes 281, and the first sub-electrodes 281 and the second sub-electrodes are respectively located between adjacent pixel electrodes 27.

It should be noted that, in FIG. 2A, the array substrate may further include: a transparent substrate 21; an interlayer 22 disposed on the transparent substrate 21; and a TFT 23 disposed on the interlayer 22, where the TFT 23 includes a source electrode 231, a drain electrode 232, a gate electrode 233 and a polycrystalline silicon layer 234, the gate electrode 233 is electrically insulated from the polycrystalline silicon layer 234 by a first passivation layer 241, the gate electrode 233 is electrically insulated from the source electrode 231 and the drain electrode 232 by a second passivation layer 242, and the source electrode 231 is electrically connected with a data line 235 via a first metal 236. The array substrate further includes an organic film layer 25 disposed on the second passivation layer 242, a common electrode 26 disposed on the organic film layer 25, pixel electrodes 27 disposed above the common electrode 26, and touch electrodes disposed on the same layer as the pixel electrodes 27 (merely the first sub-electrodes 281 are shown in FIG. 2A), where the common electrode 26 is electrically insulated from the pixel electrodes 27 and the touch electrodes by a third passivation layer 243. The interlayer 22 may be formed of silicon nitride or silicon oxide, and the first passivation layer 241, the second passivation layer 242 and the third passivation layer 243 may be formed of silicon nitride.

Since the touch electrode has a grid shape, and the first sub-electrodes 281 and the second sub-electrodes which form the touch electrode are located between adjacent pixel electrodes 27, the technical solution of the disclosure, compared with the common electrode which has a planar shape and may be also used as the touch electrode in the related art, is advantageous in one aspect in that the resistance of the touch electrode is reduced, and in another aspect in that the overlapping area between the touch electrode and the source electrode 231 as well as the first metal 236 is reduced, and hence the load capacitance formed between the touch electrode and the source electrode 231 as well as the first metal 236 is reduced. In this way, the product of the resistance of the touch electrode and the load capacitance formed between the touch electrode and the source electrode 231 as well as the first metal 236 is reduced, which can reduce the charging time of the touch driving signal, and solve the problem of insufficient time for the touch state and the display state operating in a time division manner. Moreover, when the charging time of the touch driving signal is reduced, the driving capacity of the touch electrode may be reduced, and the space in a frame area of the array substrate occupied by a touch driving circuit for providing the touch driving signal may be reduced accordingly, so that the array substrate can have a narrow frame.

In addition, since the first sub-electrodes 281 and the second sub-electrodes which form the touch electrode are located between adjacent pixel electrodes 27, the touch electrode may be made of a transparent conductive material or a metal. Since the resistance of a metal is smaller than that of a transparent conductive material, the touch electrode is preferably made of a metal, thereby further reducing the resistance of the touch electrode.

Figure 2B:
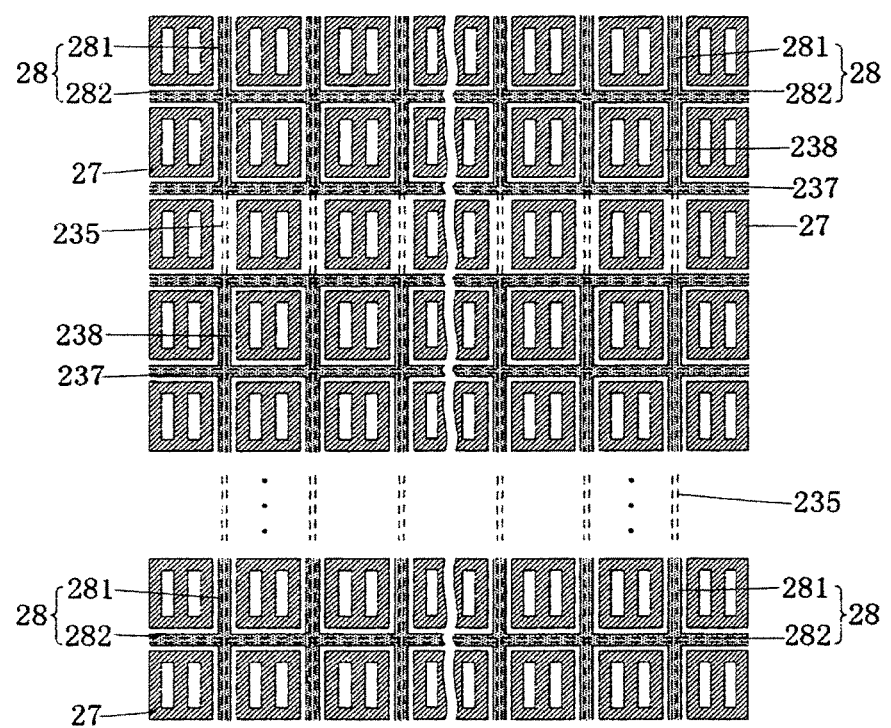
FIG. 2B is a schematic top view of the array substrate shown in FIG. 2A.

FIG. 2B is a schematic top view of the array substrate shown in FIG. 2A. In particular, as shown in FIGS. 2A and 2B, the touch electrodes 28 and the pixel electrodes 27 are disposed in the same layer, and the first sub-electrode 281 and the second sub-electrode 282 are located between adjacent pixel electrodes 27, that is, as shown in FIG. 2B, the first sub-electrode 281 is located between adjacent columns of pixel electrodes 27, and the second sub-electrode 282 is located between adjacent rows of pixel electrodes 27. In addition, in FIG. 2B, dotted lines along the vertical direction refer to data lines 235, and dotted lines along the horizontal direction refer to scanning lines 237; moreover, a plurality of data lines 235 and scanning lines 237 are crosswise arranged and define pixel units 238.

Figure 3A:
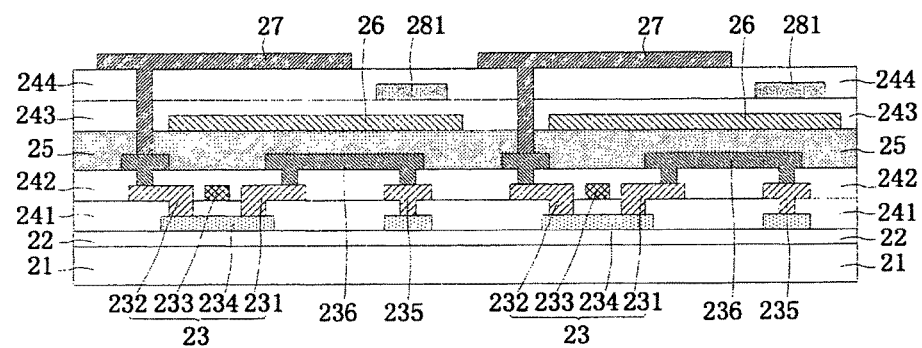
FIG. 3A is a schematic diagram of a partial structure of another array substrate according to an embodiment of the disclosure.
Figure 3B:
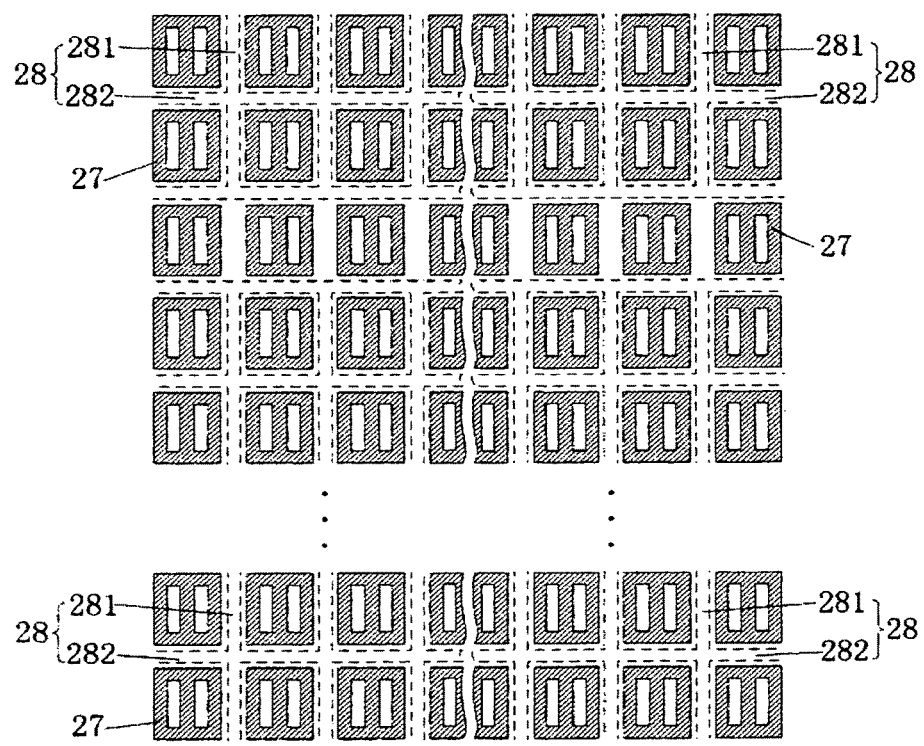
FIG. 3B is a schematic top view of the array substrate shown in FIG. 3A.

Unlike the above case where the touch electrodes 28 and the pixel electrodes 27 are located in the same layer as shown in FIGS. 2A and 2B, the touch electrodes 28 and the pixel electrodes 27 may also be located in different layers. As shown in FIGS. 3A and 3B, the touch electrodes 28 are located between the pixel electrodes 27 and the common electrodes 26, the touch electrodes 28 are electrically insulated from the common electrodes 26 by a third passivation layer 243, and the touch electrodes 28 are electrically insulated from the pixel electrodes 27 by a fourth passivation layer 244; moreover, the projection of the first sub-electrode 281 onto the layer containing the pixel electrodes 27 is located between adjacent pixel electrodes 27, and the projection of the second sub-electrode 282 onto the layer containing the pixel electrodes 27 is located between adjacent pixel electrodes 27. It should be noted that the third passivation layer 243 and the fourth passivation layer 244 may be formed of silicon nitride.

It should be noted that arrangements of corresponding data lines and scanning lines are omitted in the top view FIG. 3B to clearly show the first sub-electrodes and the second sub-electrodes since the arrangements of the data lines and the scanning lines are not changed in the array substrate shown in FIGS. 2A and 3A.

In addition to the above configuration of the touch electrodes, given that the touch electrode has a grid shape and the projections of the first sub-electrodes and the second sub-electrodes onto the layer containing the pixel electrodes are respectively located between adjacent pixel electrodes, or the first sub-electrodes and the second sub-electrodes are respectively located between adjacent pixel electrodes. However, a configuration of the touch electrodes is not limited herein in an actual design as long as the load capacitance formed between the touch electrode and the source electrode as well as the first metal can be further reduced.

Preferably, in an embodiment of the disclosure, the projections of the first sub-electrodes 281 onto the layer containing the data lines 235 may overlap with the data lines 235; and the projections of the second sub-electrodes 282 onto the layer containing the scanning lines may overlap with the scanning lines. Since the data lines and the scanning lines on the array substrate are totally shielded by a black matrix on a color filter substrate in a light transmission direction after the array substrate and the color filter substrate are joined together, the touch electrodes 28 may be better shielded in the light transmission direction by the black matrix if the projections of the first sub-electrodes 281 onto the layer containing the data lines 235 overlap with the data lines 235 and the projections of the second sub-electrodes 282 onto the layer containing the scanning lines overlap with the scanning lines.

As shown in FIG. 2B or FIG. 3B, the touch electrode 28 has a strip shape in an embodiment of the disclosure. Alternatively, the touch electrode 28 may have a fish-bone shape, a zigzag shape, a dendriform shape or the like, which is not limited, as long as the touch electrode 28 is capable of achieving a touch function.

As shown in FIG. 2B or FIG. 3B, a grid unit of the touch electrode 28 surrounds one pixel unit in an embodiment of the disclosure. FIG. 2B or FIG. 3B is only an exemplary embodiment of the disclosure. In other embodiments, the grid unit of the touch electrodes 28 may surround two or more pixel units, the grid unit of the touch electrode 28 is not limited herein as long as the touch electrode 28 is capable of achieving a touch function.

Figure 4A:
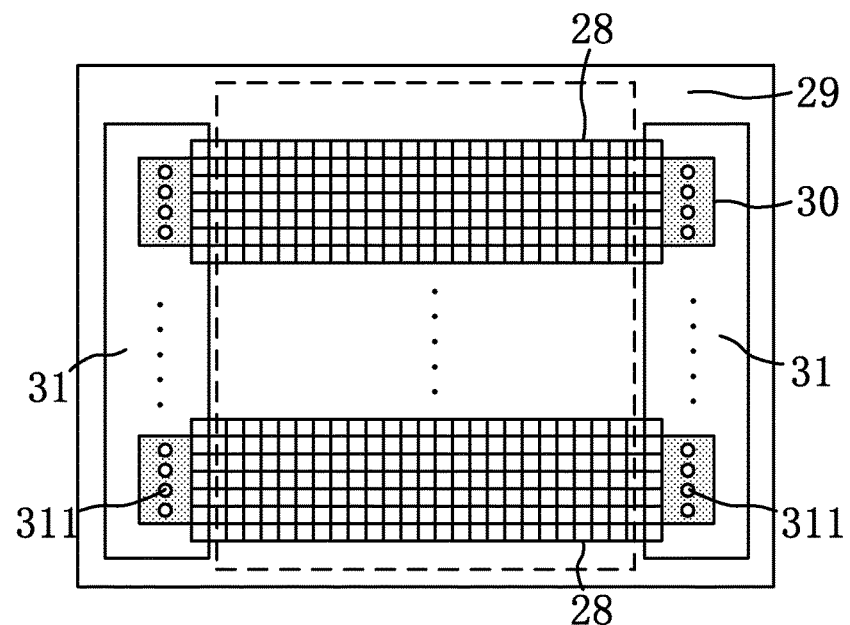
FIG. 4A is a schematic diagram of a structure showing touch electrodes receiving touch driving signals according to an embodiment of the disclosure.

As shown in FIG. 4A, the array substrate in the embodiment of the disclosure further includes display driving circuits disposed at both (opposite) ends of the touch electrodes and located in the frame area, and touch driving circuits integrated together with the display driving circuits (represented by integrated circuits 31 including the display driving circuits and the touch driving circuits in FIG. 4A). The display driving circuit is configured to provide display driving signals for the pixel units, and the touch driving circuit is configured to provide touch driving signals for the touch electrodes. The touch driving circuits are disposed below the layer containing the touch electrodes 28, and the touch electrodes 28 are electrically connected with the touch driving circuits through via holes 311.

It should be noted that the display driving circuits and the touch driving circuits are disposed on the transparent substrate in the frame area of the array substrate, and each may be formed by a combination of a TFT, a resistor, a capacitance and so on, where the TFT may be formed simultaneously with TFTs in a display area, as long as it can be achieved that the display driving circuits provide display driving signals for the pixel units and the touch driving circuits provide touch driving signals for the touch electrodes.

Specifically, the touch driving circuit is further electrically connected with a touch integrated chip disposed on a Flexible Printed Circuit (FPC), so that the touch integrated chip can control the time for the touch driving circuit to generate a touch driving signal, the duration of the generated touch driving signal, and a waveform of the touch driving signal; in addition, the touch integrated chip is further electrically connected with a touch sensing electrode to receive and process a generated touch sensing signal.

Figure 4B:
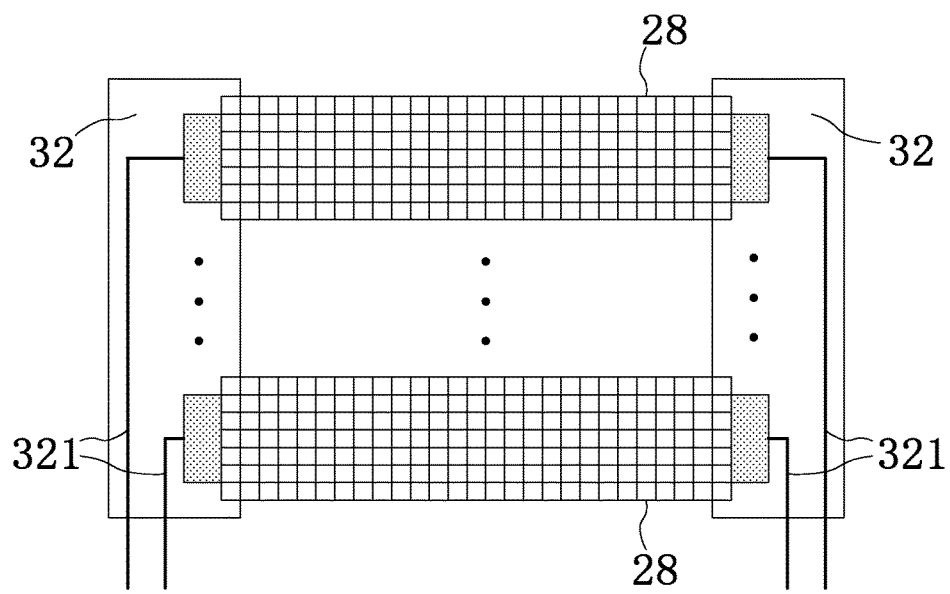
FIG. 4B is a schematic diagram of another structure showing touch electrodes receiving touch driving signals according to an embodiment of the disclosure.

In an embodiment of the disclosure, the touch electrodes may obtain touch driving signals in other manners in addition to that shown in FIG. 4A. As shown in FIG. 4B, the array substrate further includes display driving circuits 32 disposed at both (opposite) ends of the touch electrodes and located in the frame area, and touch driving lines 321 that are disposed above the display driving circuits 32. The display driving circuit 32 is configured to provide display driving signals for the pixel units, and the touch driving line 321 is electrically connected with the touch electrode 28 and provides a touch driving signal for the touch electrode 28.

Specifically, the touch driving line 321 is electrically connected with a touch integrated chip disposed on the FPC. At the beginning of the touch state, the touch integrated chip generates touch driving signals, which are provided to the touch electrodes 28 via the touch driving lines 321.

It should be noted that FIGS. 2B, 3B, 4A and 4B provide exemplary embodiments where the touch electrode 28 may be used as a touch driving electrode, i.e. the capacitive touch function is achieved by mutual capacitance. Alternatively, capacitance may further be formed between the touch electrode and ground, i.e. the capacitive touch function is achieved by self capacitance. The implementation of the capacitive touch function through self capacitance by the touch electrode is further described in detail below.

Figure 5:
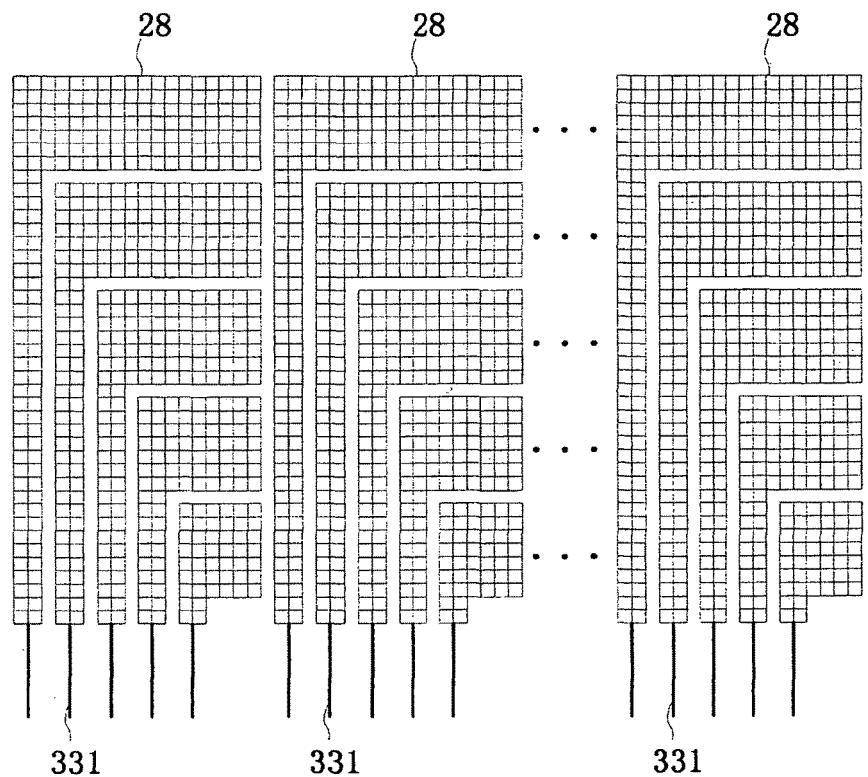
FIG. 5 is a schematic diagram of still another structure showing touch electrodes receiving touch driving signals according to an embodiment of the disclosure.

As shown in FIG. 5, the touch electrodes 28 have a block shape (e.g., a rectangular shape), and each touch electrode 28 is electrically connected with a touch electrode line 331. Capacitance is formed between the touch electrode 28 shown in FIG. 5 and ground, i.e. the capacitive touch function is achieved by self capacitance. As shown in FIG. 5, one end of the touch electrode line 331 is electrically connected with a touch integrated chip disposed on the FPC. At the beginning of the touch state, the touch integrated chip generates touch driving signals, which are provided to the touch electrodes 28 via the touch electrode lines 331, so that the touch electrodes 28 carries a certain amount of electric charges; when a touch occurs on the touch panel, the touch integrated chip reads the electric charges in the touch electrode 28 via the touch electrode line 331, and then determines which touch electrode 28 or touch electrodes 28 are touched according to the change of the amount of electric charges, so that a location of a touch point may be further confirmed.

Figure 6:
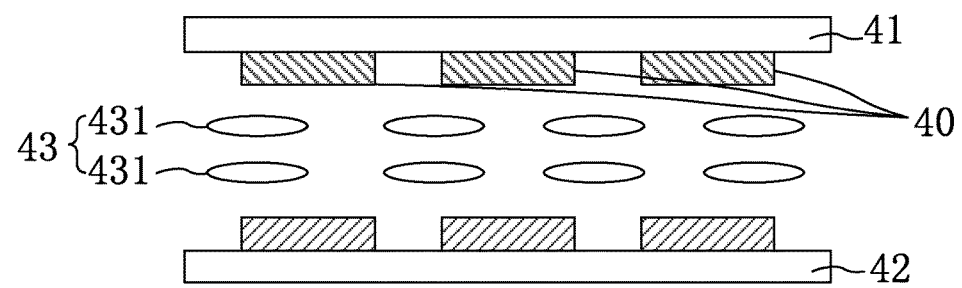
FIG. 6 is a schematic diagram of a structure of a display panel according to an embodiment of the disclosure.

An embodiment of the disclosure further provides a display panel. FIG. 6 shows a display panel according to an embodiment of the disclosure. As shown in FIG. 6, the display panel includes a color filter substrate 41, an array substrate 42 disposed opposite to the color filter substrate 41, and a liquid crystal layer 43 disposed between the color filter substrate 41 and the array substrate 42. The liquid crystal layer 43 is formed of liquid crystal molecules 431, where the array substrate 42 is an array substrate described in the above embodiments.

Further, in an embodiment of the disclosure, the color filter substrate includes black matrixes shielding an area in which the touch electrodes are located.

Further, in an embodiment of the disclosure, the display panel further includes touch sensing electrodes disposed at the side of the color filter substrate facing away from the liquid crystal layer when the touch electrode is used as a touch driving electrode.

Further, in an embodiment of the disclosure, a working state of the display panel includes a display state and a touch state, and the display state and the touch state operate in a time division manner.

In a specific embodiment, the display panel mostly operates in the display state. In the display state, a common voltage signal may be applied to the touch electrode, and the display state is ended and the touch status is started when a touch occurs on the display panel, that is, the display state and the touch state operate in the time division manner. Moreover, in the touch state, the touch driving signal is applied to the touch electrode, so as to implement the touch function by the touch electrode. By applying a common voltage signal to the touch electrode in the display state, the impact of a voltage remained on the touch electrode to rotation of the liquid crystal molecules after the touch status is ended may be avoided, so that a good display effect of the display panel may be ensured.

Although the display state and the touch state may operate in a time division manner as described above, the display state and the touch state may operate concurrently. In a specific embodiment, in the display state, common voltage signals are applied to the touch electrodes, and the display state will not ended when a touch occurs, instead, both the display state and the touch state exist concurrently when the touch occurs, that is, the display state and the touch state operate concurrently. Moreover, when both the display state and the touch state exist at the same time, touch driving signals are applied to the touch electrodes so as to enable the implementation of the touch function by the touch electrodes.

Figure 7:
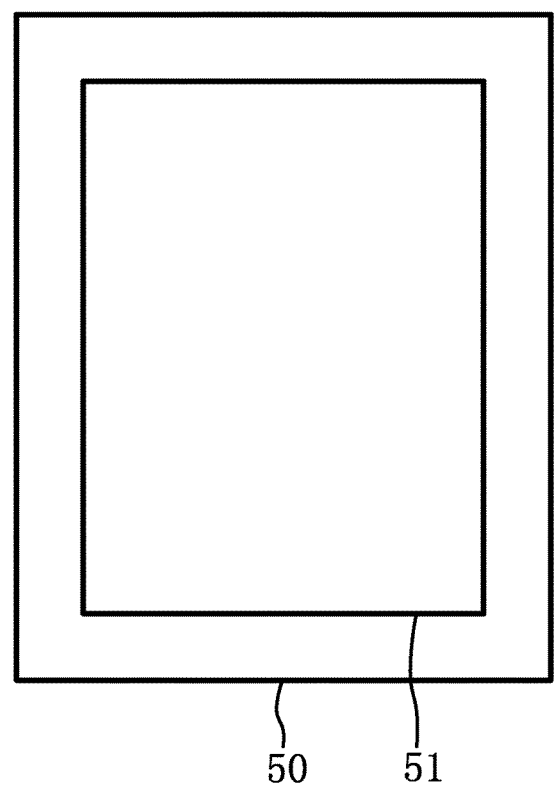
FIG. 7 is a schematic diagram of a structure of a display device according to an embodiment of the disclosure.

An embodiment of the disclosure further provides a display device. FIG. 7 is a schematic diagram of a structure of a display device according to an embodiment of the disclosure. As shown in FIG. 7, a display device 50 includes a display panel 51, a driving circuit, and other components to support the normal operation of the display device 50. The display panel 51 is a display panel described in the above embodiments. The display device 50 may be one of a mobile phone, a tablet computer, electronic paper and an electronic photo frame in some embodiments.

In the array substrate, the display panel and the display device provided in the embodiment of the present disclosure, the touch electrode is designed to have a grid shape, and the projections of the first sub-electrodes and the second sub-electrodes which form the touch electrode onto the layer containing the pixel electrodes are located between adjacent pixel electrodes, or the first sub-electrodes and the second sub-electrodes are configured to be located between adjacent pixel electrodes, so that in one aspect the resistance of the touch electrode is reduced, and in another aspect the overlapping area between the touch electrode and the source electrode as well as the first metal is reduced, and hence, the product of the resistance of the touch electrode and the load capacitance formed between the touch electrode and the source electrode as well as the first metal may be reduced, so that the charging time of the touch driving signals may be reduced, and the problem of insufficient time for the touch status and the display status to operate in a time division manner may be solved.

It is noted that preferable embodiments and the applied technology principles of the present disclosure are merely described as above. It should be understood by those skilled in the art that the present disclosure is not limited to particular embodiments described herein. Various apparent changes, readjustment and alternative can be made by those skilled in the art without departing from the scope of protection of the present disclosure. Therefore, although the present disclosure is illustrated in detail through the above embodiments, the present disclosure is not merely limited to the above embodiments, and can further include more of other equivalent embodiments without departing from the concept of the present disclosure. The scope of the present disclosure is subject to the appended claims.

What is claimed is:

1. An array substrate, comprising:
a plurality of data lines;
a plurality of scanning lines intersecting the plurality of data lines to define a plurality of pixel units;
a plurality of pixel electrodes each formed in one of the plurality of pixel units; and
a plurality of touch electrodes forming a grid of rectangular frames, wherein the grid of rectangular frames comprises a plurality of first touch sub-electrodes and a plurality of second touch sub-electrodes intersecting the plurality of first sub-electrodes, wherein the plurality of first touch sub-electrodes is parallel to the plurality of data lines,
wherein the grid of rectangular frames further includes a first set of sub-electrodes and a second set of sub-electrodes perpendicular to the first set of sub-electrodes, wherein the projection of each of the first set of sub-electrodes onto the layer containing the data lines overlaps with a corresponding one of the plurality of data lines; and the projection of each of the second set of sub-electrodes onto the layer containing the scanning lines overlaps with a corresponding one of the plurality of scanning lines;
wherein the array substrate further comprises a plurality of thin film transistors, each comprising a source electrode, a drain electrode, a gate electrode and a polycrystalline silicon layer, wherein the gate electrode is electrically insulated from the polycrystalline silicon layer by a first passivation layer, wherein the gate electrode is electrically insulated from the source electrode and the drain electrode by a second passivation layer, wherein the source electrode of each of the plurality of thin film transistors is electrically connected with a respective data line of the plurality of data lines via a first metal;
wherein the overlapping area, between each of the plurality of touch electrodes and the first metal and the source electrode connecting to the first metal, is reduced, wherein a load capacitance formed between said touch electrode and said source electrode as well as said first metal is reduced, decreasing a charging time of touch electrodes;
wherein the rectangular frames and the plurality of pixel electrodes are arranged on different layers, a projection of each of the rectangular frames onto the layer of the plurality of pixel electrodes encloses but does not overlap at least one of the pixel units, and a layer of the plurality of touch electrodes are located between the layer of the plurality of pixel electrodes and a layer of a plurality of common electrodes and electrically insulated from the layer of the plurality of pixel electrodes and the layer of the plurality of common electrodes by a third passivation layer, and wherein the plurality of common electrodes and the plurality of pixel electrodes form an electric field for display.

2. The array substrate according to claim 1, wherein the plurality of common electrodes disposed below the plurality of pixel electrodes and electrically insulated from the plurality of pixel electrodes.

3. The array substrate according to claim 2, wherein the plurality of touch electrodes each has a block shape, and each of the plurality of touch electrodes is electrically connected with a touch electrode line.

4. The array substrate according to claim 2, further comprising:

a plurality of display driving circuits disposed at opposite ends of the touch electrodes and located in a frame area; and a plurality of touch driving circuits integrated together with the plurality of display driving circuits;

wherein the plurality of display driving circuits are configured to provide a plurality of display driving signals to the plurality of pixel units, and the plurality of touch driving circuits are configured to provide a plurality of touch driving signals to the plurality of touch electrodes; and the plurality of touch driving circuits are disposed below a layer containing the plurality of touch electrodes, and the plurality of touch electrodes each is electrically connected with one of the plurality of touch driving circuits through via holes.

5. The array substrate according to claim 2, further comprising:

a plurality of display driving circuits disposed at opposite ends of the plurality of touch electrodes and located in a frame area, and a plurality of touch driving lines disposed above the plurality of display driving circuits;

wherein the plurality of display driving circuits are configured to provide display driving signals to the plurality of pixel units, and the plurality of touch driving lines are electrically connected with the plurality of touch electrodes and configured to provide touch driving signals to the plurality of touch electrodes.

6. The array substrate according to claim 1, wherein each of the plurality of touch electrode is made of a metal.

7. The array substrate according to claim 1, wherein two of the plurality of pixel units are surrounded by a grid unit of the plurality of touch electrodes.

8. The array substrate according to claim 1, wherein the plurality of touch electrodes each has a strip shape.

9. The array substrate according to claim 1, wherein the plurality of touch electrodes each has a block shape, and each is electrically connected with a touch electrode line.

10. The array substrate according to claim 1, further comprising a plurality of display driving circuits disposed at opposite ends of the plurality of touch electrodes and located in a frame area, and a plurality of touch driving circuits integrated together with the plurality of display driving circuits;

wherein the plurality of display driving circuits are configured to provide display driving signals to the plurality of pixel units, and the plurality of touch driving circuits are configured to provide touch driving signals to the plurality of touch electrodes; and wherein the touch driving circuits are disposed below a layer containing the plurality of touch electrodes, and the plurality of touch electrodes each is electrically connected with each of the plurality of touch driving circuits through via holes.

11. The array substrate according to claim 1, further comprising a plurality of display driving circuits disposed at opposite ends of the plurality of touch electrodes and located in a frame area, and a plurality of touch driving lines disposed above the plurality of display driving circuits;

wherein the plurality of display driving circuits are configured to provide a plurality of display driving signals to the plurality of pixel units, and the touch driving lines are electrically connected with the plurality of touch electrodes and configured to provide a plurality of touch driving signals to the plurality of touch electrodes.

12. A display panel comprising a color filter substrate, an array substrate disposed opposite to the color filter substrate, and a liquid crystal layer between the color filter substrate and the array substrate; wherein the array substrate is the array substrate of claim 1.

13. The display panel according to claim 12, further comprising a plurality of touch sensing electrodes disposed on a side of the color filter substrate facing away from the liquid crystal layer when the plurality of touch electrodes are used as touch driving electrodes.

14. The display panel according to claim 12, wherein the color filter substrate comprises a plurality of black matrixes shielding an area in which the plurality of touch electrodes are located.

15. The display panel according to claim 12, wherein a working state of the display panel comprises a display state and a touch state, wherein the display state and the touch state operate in a time division manner.

16. The display panel according to claim 15, wherein, in the display state, a common voltage signal is applied to the plurality of touch electrodes; and in the touch state, a touch driving signal is applied to the plurality of touch electrodes.

17. A display device, comprising the display panel of claim 12.

18. An array substrate according to claim 1, further comprising:

a first passivation layer formed between the layer of the plurality of touch electrodes and the layer of the plurality of pixel electrodes, and a second passivation layer formed between the layer of the common electrodes and the layer of the plurality of touch electrodes.

19. The array substrate according to claim 1, wherein the array substrate has a display state and a touch state, the display state and the touch state operate in a concurrent manner, wherein in the concurrent manner, the touch state operates concurrently with the display state, and wherein a plurality of touch driving signals are applied to the plurality of touch electrodes.

* * * * *